United States Patent
Honjo et al.

(10) Patent No.: US 10,767,615 B2
(45) Date of Patent: Sep. 8, 2020

(54) MULTIPURPOSE VEHICLE

(71) Applicant: Kubota Corporation, Osaka-shi (JP)

(72) Inventors: Noriyasu Honjo, Sakai (JP); Takeshi Satozono, Sakai (JP); Jun Yoshida, Sakai (JP); Rihito Fukuda, Tokyo (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/354,119

(22) Filed: Nov. 17, 2016

(65) Prior Publication Data

US 2017/0253120 A1    Sep. 7, 2017

(51) Int. Cl.

| | |
|---|---|
| *F02M 63/02* | (2006.01) |
| *F02D 41/34* | (2006.01) |
| *F02D 41/00* | (2006.01) |
| *F02D 41/02* | (2006.01) |
| *B60K 17/342* | (2006.01) |
| *B60K 31/02* | (2006.01) |

(Continued)

(52) U.S. Cl.
CPC ....... *F02M 63/0205* (2013.01); *B60K 17/342* (2013.01); *B60K 31/02* (2013.01); *B60W 30/146* (2013.01); *B60W 30/188* (2013.01); *F02D 31/009* (2013.01); *F02D 41/0082* (2013.01); *F02D 41/0087* (2013.01); *F02D 41/021* (2013.01); *F02D 41/0225* (2013.01); *F02D 41/34* (2013.01); *B60K 17/344* (2013.01); *B60K 2005/003* (2013.01); *B60K 2031/0091* (2013.01); *B60W 2510/0638* (2013.01); *B60W 2520/10* (2013.01); *B60W 2540/10* (2013.01); *B60Y 2400/72* (2013.01); *F02D 41/123* (2013.01); *F02D 2200/501* (2013.01); *Y02T 10/44* (2013.01)

(58) Field of Classification Search
CPC ............. F02D 2200/501; F02D 41/008; F02D 41/0082; F02M 63/0205
USPC ........................ 123/198 F, 481; 701/110, 112
See application file for complete search history.

(56) References Cited

U.S. PATENT DOCUMENTS 4,061,055 A * 12/1977 Iizuka ................. F02D 41/0087
                                                                    477/110
4,134,261 A *  1/1979 Iizuka ..................... F02D 17/02
                                                                     60/276

(Continued)

FOREIGN PATENT DOCUMENTS

| JP | 52122740 U1 | 9/1977 |
| JP | 6159110 A | 6/1994 |

(Continued)

*Primary Examiner* — Kevin R Steckbauer
(74) *Attorney, Agent, or Firm* — The Webb Law Firm (57) ABSTRACT

A multipurpose vehicle includes an engine that has a plurality of cylinders, a traveling vehicle body that has a traveling device that is driven based on a driving force of the engine, a man-operable accelerator operating tool, a controller that controls a fuel injection quantity with respect to the plurality of cylinders of the engine based on an amount of operation of the accelerator operating tool, and a vehicle speed sensor that detects a traveling speed of the traveling vehicle body. If the traveling speed of the traveling vehicle body reaches or exceeds a set maximum traveling speed, the controller suppresses the fuel injection quantity supplied with respect only to one/some of the plurality of cylinders, irrespective of the amount of operation of the accelerator operating tool.

6 Claims, 5 Drawing Sheets

(51) Int. Cl.
  *B60W 30/14* (2006.01)
  *B60W 30/188* (2012.01)
  *F02D 31/00* (2006.01)
  *B60K 31/00* (2006.01)
  *B60K 17/344* (2006.01)
  *B60K 5/00* (2006.01)
  *F02D 41/12* (2006.01)

(56) References Cited

U.S. PATENT DOCUMENTS

| | | | | |
|---|---|---|---|---|
| 4,401,076 | A * | 8/1983 | Sano | F02D 41/408 |
| | | | | 123/357 |
| 4,589,859 | A * | 5/1986 | Kanesaka | F16G 5/00 |
| | | | | 474/148 |
| 4,977,876 | A * | 12/1990 | Nanyoshi | F02D 41/126 |
| | | | | 123/333 |
| 5,497,751 | A * | 3/1996 | Ohtake | F02B 37/18 |
| | | | | 123/479 |
| 5,586,432 | A * | 12/1996 | Huemer | F02D 41/0087 |
| | | | | 60/274 |
| 7,027,908 | B2 * | 4/2006 | Esteghlal | F02D 31/006 |
| | | | | 123/406.46 |
| 7,500,469 | B2 * | 3/2009 | Akita | B60K 6/445 |
| | | | | 123/431 |
| 7,826,957 | B2 * | 11/2010 | Fabien | F02D 41/0025 |
| | | | | 701/103 |
| 7,925,418 | B2 * | 4/2011 | Fabien | F02D 19/0623 |
| | | | | 701/103 |
| 10,161,325 | B2 * | 12/2018 | Zur Loye | F02D 41/0082 |
| 2002/0016660 | A1 * | 2/2002 | Suzuki | B60K 6/48 |
| | | | | 701/62 |
| 2004/0255903 | A1 * | 12/2004 | Esteghlal | F02D 37/02 |
| | | | | 123/350 |
| 2007/0290551 | A1 | 12/2007 | Fujimoto et al. | |
| 2008/0280729 | A1 * | 11/2008 | Miguchi | B60W 30/186 |
| | | | | 477/175 |
| 2010/0191439 | A1 * | 7/2010 | Fabien | F02D 19/0623 |
| | | | | 701/103 |
| 2011/0046866 | A1 * | 2/2011 | Fabien | F02D 31/009 |
| | | | | 701/104 |
| 2012/0265427 | A1 * | 10/2012 | Petridis | B60W 10/02 |
| | | | | 701/113 |
| 2014/0261315 | A1 * | 9/2014 | Willard | F02D 17/02 |
| | | | | 123/349 |
| 2015/0354484 | A1 * | 12/2015 | Zur Loye | F02D 41/0245 |
| | | | | 123/481 |
| 2018/0213718 | A1 * | 8/2018 | Honjo | A01D 34/008 |

FOREIGN PATENT DOCUMENTS

| | | | | |
|---|---|---|---|---|
| JP | 09088665 | A * | 3/1997 | ........... Y02T 10/144 |
| JP | 09088665 | A * | 3/1997 | ........... Y02T 10/144 |
| JP | H09088665 | A * | 3/1997 | ........... Y02T 10/144 |
| JP | 2003328824 | A * | 11/2003 | ........... F02D 41/14 |
| JP | 2003328824 | A * | 11/2003 | ........... F02D 41/14 |
| JP | 2007321850 | A | 12/2007 | |
| JP | 2008196416 | A | 8/2008 | |

* cited by examiner

Fig.5

MULTIPURPOSE VEHICLE

CROSS-REFERENCE TO RELATED APPLICATION

This application claims priority to Japanese Patent Application No. 2016-041388 filed Mar. 3, 2016, the disclosure of which is hereby incorporated in its entirety by reference.

BACKGROUND OF THE INVENTION

Field of the Invention

The present invention relates to a multipurpose vehicle which is configured as a vehicle that can be used for various purposes such as cargo transport or recreation, and referred to as a "utility vehicle" also.

Description of Related Art

For example, JP 2007-321850A (or US 2007/0290551 A1 corresponding thereto) discloses a conventional multipurpose vehicle that includes an engine having a plurality of cylinders. The multipurpose vehicle disclosed in JP 2007-321850A 1 includes an engine that has a plurality of cylinders, a traveling vehicle body that has a traveling device ("front wheels" and "rear wheels" in JP 2007-321850A) that is driven based on a driving force of the engine, a man-operable accelerator operating tool ("an accelerator pedal" in JP 2007-321850A), and a controller that controls the fuel injection quantity with respect to the plurality of cylinders of the engine based on the amount of operation of the accelerator operating tool.

In such a conventional multipurpose vehicle, when the traveling speed of the traveling vehicle body approaches a set maximum traveling speed, the fuel injection quantity with respect to the plurality of cylinders of the engine is suppressed irrespective of the amount of operation of the accelerator operating tool to prevent an increase in the rotational speed of the engine. In this manner, overloading of the engine is avoided, and an increase in the traveling speed of the traveling vehicle body is suppressed.

Incidentally, when the traveling speed of the traveling vehicle body approaches the set maximum traveling speed, and the fuel injection quantity with respect to the cylinders of the engine is suppressed, an abnormal sound, which is different from a normally occurring sound, may be intermittently emitted from the cylinders of the engine.

According to the above-described conventional technology, when the traveling speed of the traveling vehicle body approaches the set maximum traveling speed, the fuel injection quantity is suppressed with respect to all of cylinders of the engine. Therefore, the abnormal sound associated with the suppression of the fuel injection quantity is emitted by the number of the plurality of cylinders subject to the fuel injection quantity suppression. Furthermore, since the cylinders are driven at different timings, the frequency of emission of the abnormal sound from the engine also increases. Thus, when the traveling speed of the traveling vehicle body approaches the set maximum traveling speed, the noise emitted from the engine may be harsh to the ear.

In view of the above-described circumstances, it is desired to provide a multipurpose vehicle according to which, when the traveling speed of the traveling vehicle body is close to the set maximum traveling speed, the load applied to the engine can be suppressed, and unpleasantness of the noise emitted from the engine can be mitigated.

SUMMARY OF THE INVENTION

A multipurpose vehicle according to the present invention includes: an engine that has a plurality of cylinders; a traveling vehicle body that has a traveling device that is driven based on a driving force of the engine; a man-operable accelerator operating tool; a controller that controls a fuel injection quantity with respect to the plurality of cylinders of the engine based on an amount of operation of the accelerator operating tool; and a vehicle speed sensor that detects a traveling speed of the traveling vehicle body. If the traveling speed of the traveling vehicle body reaches or exceeds a set maximum traveling speed, the controller suppresses the fuel injection quantity supplied with respect only to one/some of the plurality of cylinders, irrespective of the amount of operation of the accelerator operating tool.

According to the above configuration, if the traveling speed of the traveling vehicle body reaches or exceeds the set maximum traveling speed, only one/some of the plurality of cylinders will be subject to the fuel injection quantity suppression at a time and not the remainder, irrespective of the amount of operation of the accelerator operating tool. Thus, an increase in the rotational speed of the engine is prevented, so that overloading of the engine can be avoided, and also an increase in the traveling speed of the traveling vehicle body can be suppressed.

Moreover, if the traveling speed of the traveling vehicle body reaches and exceeds the set maximum traveling speed, the suppression of the fuel injection quantity is performed with respect only to one/some cylinder of the plurality of cylinders and not the remainder, and therefore, an abnormal sound that is emitted from the engine due to the suppression of the fuel injection quantity with respect to the cylinders can be reduced to a low level. Thus, when the traveling speed of the traveling vehicle body is close to the set maximum traveling speed, the unpleasantness of noise emitted from the engine can be mitigated.

It should be noted that the term/phrase regarding "suppression of the fuel injection quantity" should include not only "setting the fuel injection quantity to be zero", but also "reducing the fuel injection quantity to be smaller than usual", i.e. compared with the fuel injection quantity of the remainder of the plurality of the cylinders that is not subject to "suppression of the fuel injection quantity".

As described above, when the traveling speed of the traveling vehicle body is close to the set maximum traveling speed, it is possible to suppress the load applied to the engine and to mitigate the unpleasantness of the noise emitted from the engine.

With respect to the above-described configuration, it is preferable that, when the traveling speed of the traveling vehicle body is equal to or higher than the set maximum traveling speed, the controller changes the cylinder subject to fuel injection quantity suppression from one to another of the plurality of cylinders at predetermined time intervals.

With this configuration, when the traveling speed of the traveling vehicle body is equal to or higher than the set maximum traveling speed, the cylinder subject to fuel injection quantity suppression is changed at predetermined time intervals. Therefore, compared with e.g. a configuration in which the fuel injection quantity suppression is continuously made with respect to the same cylinder, variations in load, temperature and the like between the cylinders are reduced, and thus, it is possible to make it unlikely that the durability of the engine will be impaired.

With respect to the above-described configuration, it is preferable that the multipurpose vehicle further includes: a rotation sensor that detects a rotational speed of the engine; and that if the rotational speed of the engine reaches or exceeds a set maximum rotational speed, the controller suppresses the fuel injection quantity supplied with respect only to at least one of the plurality of cylinders, irrespective of the amount of operation of the accelerator operating tool.

With this configuration, if the rotational speed of the engine reaches or exceeds the set maximum rotational speed, the fuel injection quantity with respect only to said one/some of the cylinders is suppressed, and not the remainder. Thus, overloading of the engine can be deterred, for example.

With respect to the above-described configuration, it is preferable that the multipurpose vehicle further includes: a belt-type power transmission device that has an input rotor, an output rotor, and an endless belt extending around and between the input rotor and the output rotor, the belt-type power transmission device transmitting the driving force of the engine toward the traveling device via the endless belt.

With this configuration, when wear occurs in the endless belt of the belt-type power transmission device, which transmits the driving force of the engine toward the traveling device, the endless belt may, for example, slip on the input rotor and the output rotor, resulting in a decrease in the driving force to be output to the traveling device from the belt-type power transmission device, a reduction in driving speed of the traveling device, the driving speed corresponding to the rotational speed of the engine, and hence a reduction in the traveling speed of the traveling vehicle body, the traveling speed corresponding to the rotational speed of the engine.

However, as described above, since a configuration is adopted in which whether or not to suppress the fuel injection quantity supplied to the cylinders of the engine is determined using the set maximum traveling speed for the traveling vehicle body as a reference, even if wear occurs in the endless belt of the belt-type power transmission device, the rotational speed of the engine is suitably controlled so that the traveling speed of the traveling vehicle body reaches the set maximum traveling speed, and thus, traveling can be performed without any problem.

With respect to the above-described configuration, it is preferable that the multipurpose vehicle further includes: a speed-changing device that is switchable to a plurality of speed shift states with different gear ratios and that changes the driving force of the engine and transmits the driving force of the engine toward the traveling device, wherein the set maximum traveling speed is set in the controller such that different set maximum traveling speeds are set for different ones of the speed shift states.

With this configuration, for each of the speed shift states, the rotational speed of the engine is controlled so that the traveling speed of the traveling vehicle body is prevented from exceeding the set maximum traveling speed corresponding to that speed shift state. Therefore, in each of the speed shift states, traveling at the set maximum traveling speed of the traveling vehicle body corresponding to that speed shift state can be performed.

Other features and advantages derived therefrom will be apparent after reading following description with reference to the drawings.

DETAILED DESCRIPTION OF THE PREFERRED EMBODIMENTS

An exemplary embodiment of the present invention will be described hereinafter with reference to the drawings.

Figure 1:
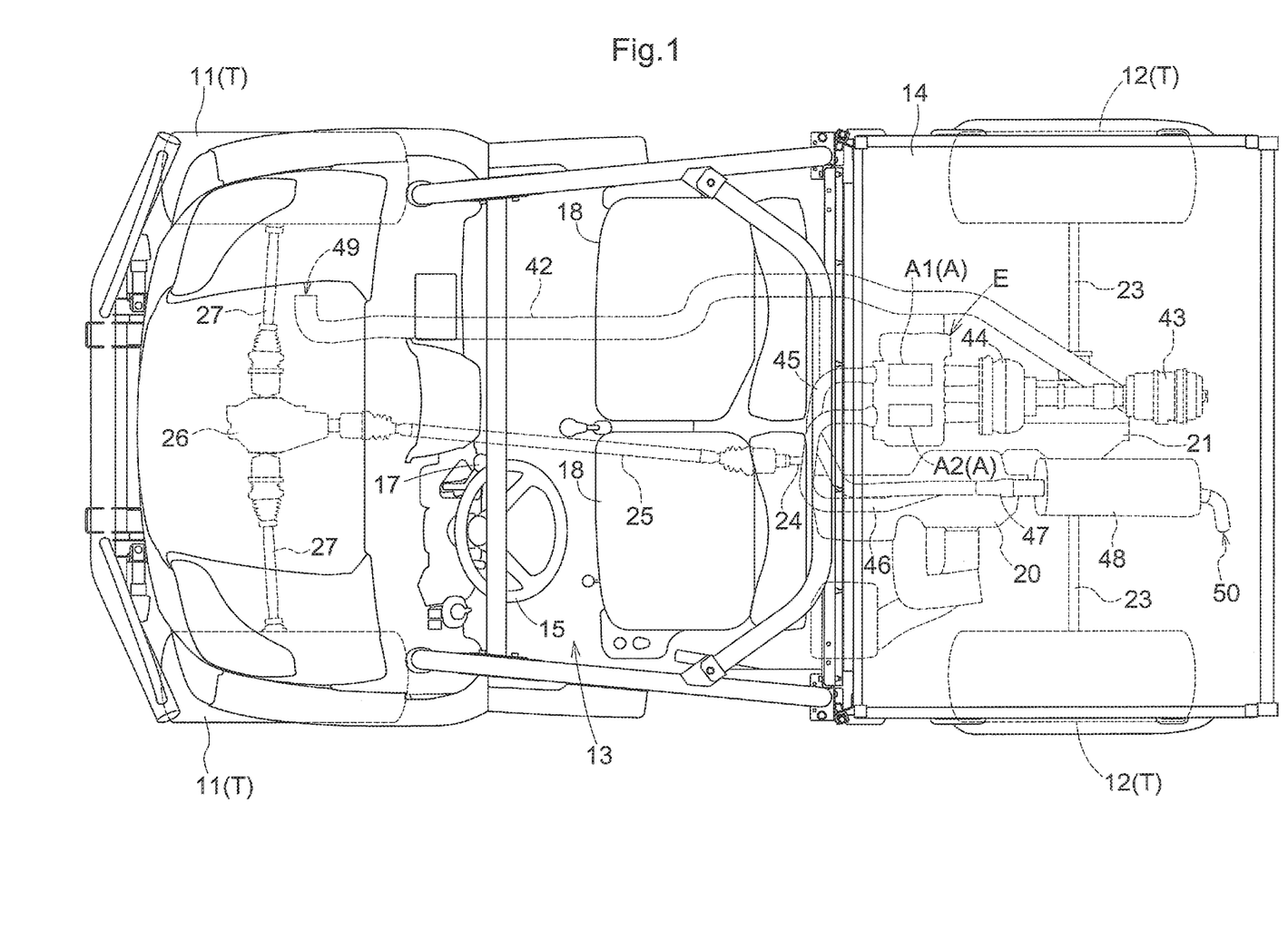
FIG. 1 is a top view of a multipurpose vehicle according to one embodiment of the present invention.
Figure 2:
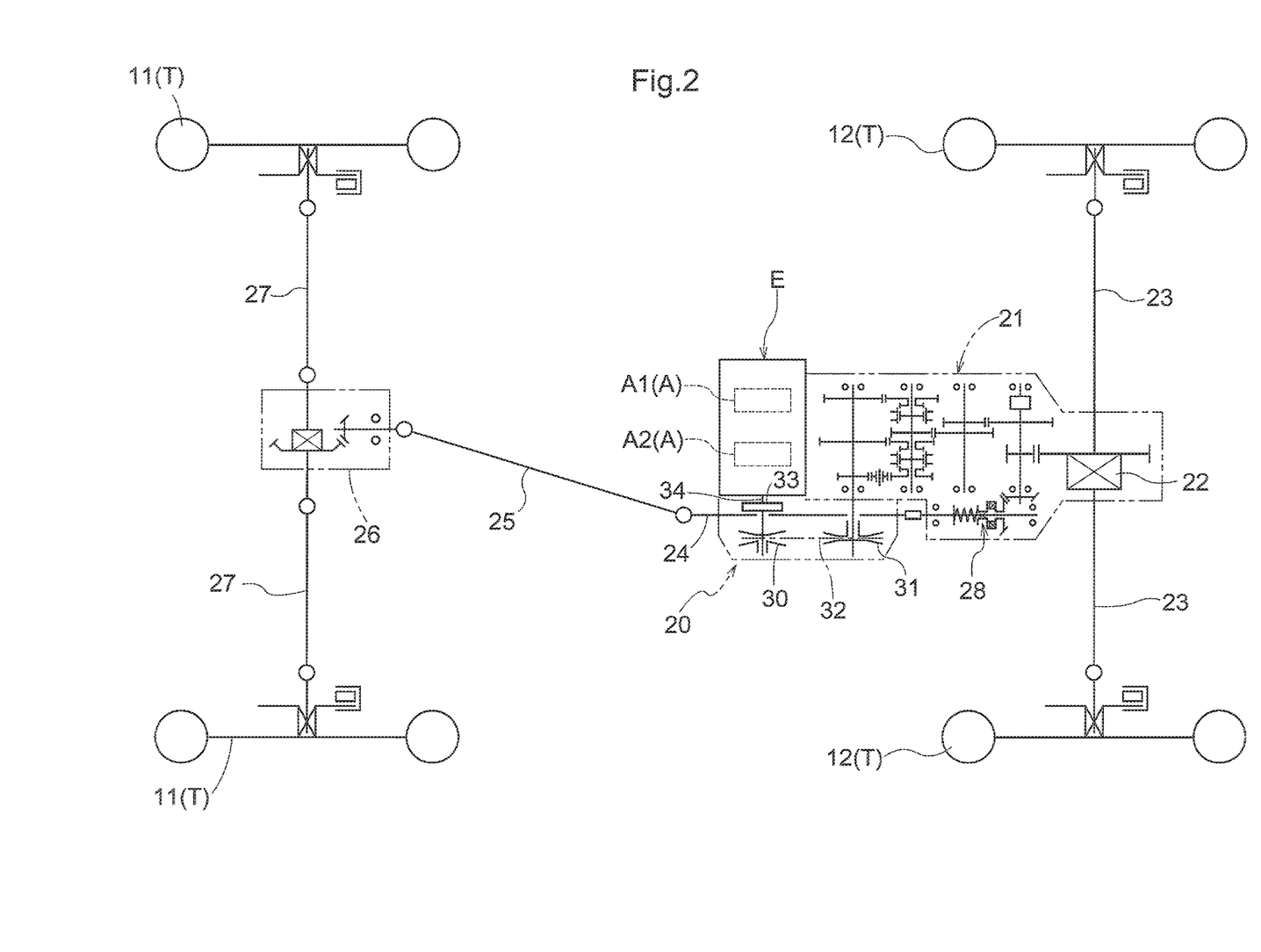
FIG. 2 is a top view showing a power transmission structure of the multipurpose vehicle.

A multipurpose vehicle shown in FIGS. 1 and 2 is configured as a vehicle that can be used for various purposes such as cargo transport or recreation, and referred to as a "utility vehicle" also. The multipurpose vehicle includes an engine E having a plurality of cylinders A, and a traveling vehicle body having traveling devices T that are driven based on a driving force of the engine E. The traveling devices T include a pair of right and left front wheels 11 that can be driven and that can be steered, and a pair of right and left rear wheels 12 that can be driven. At a central portion of the traveling vehicle body, the multipurpose vehicle includes a driver's portion 13 where a driver is seated to perform driving operations. In a rear portion of the traveling vehicle body, the multipurpose vehicle includes a cargo bed 14 on which cargo can be carried and from which cargo can be dumped.

Figure 3:
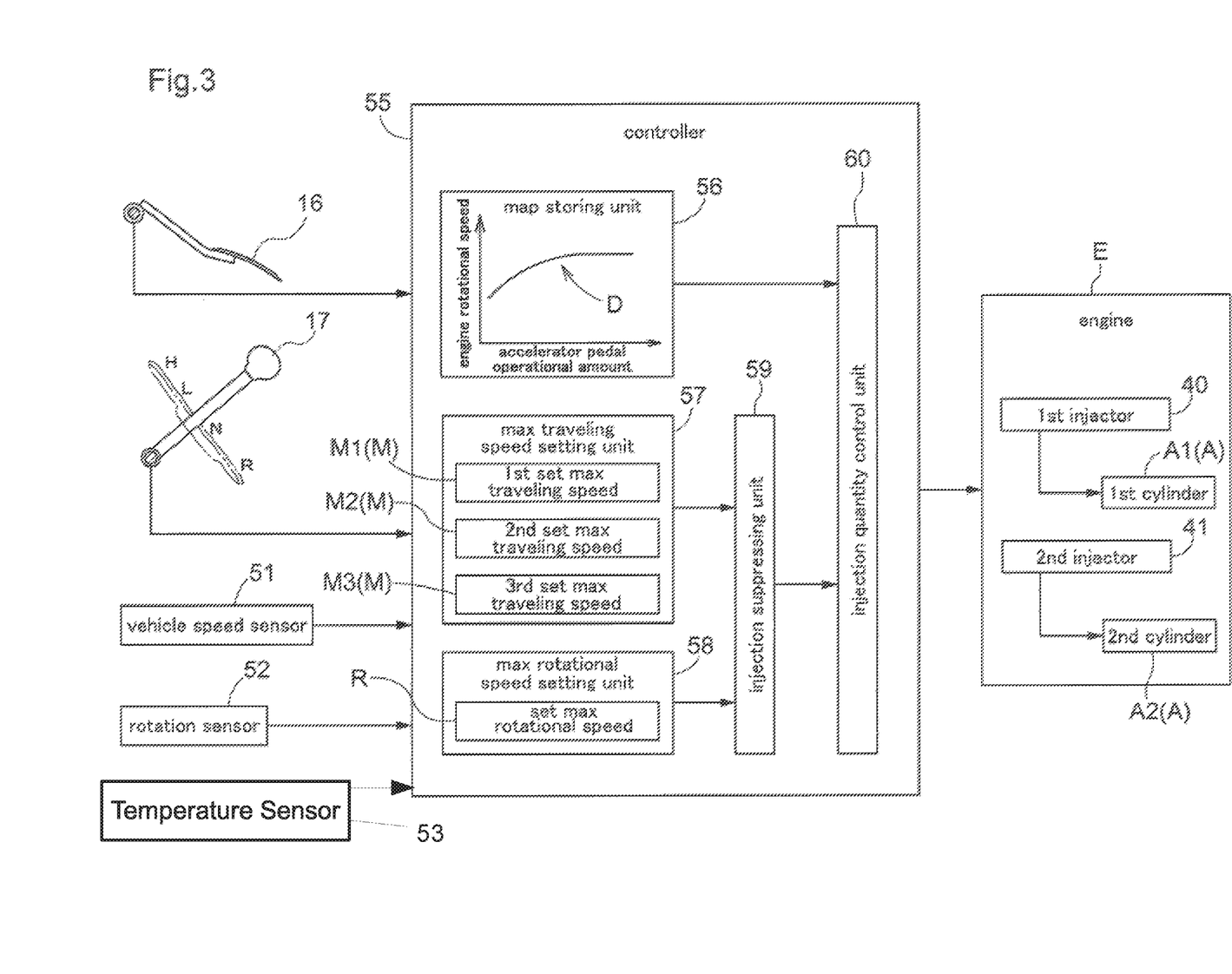
FIG. 3 is a block diagram showing a control configuration.

As shown in FIGS. 1 and 3, in the driver's portion 13, the multipurpose vehicle includes a steering wheel 15 for steering the front wheels 11; a man-operable accelerator pedal 16 (an example of "accelerator operating tool") that is used to change the traveling speed; a shift lever 17 that is used for changing speeds of the multipurpose vehicle; seats 18 on which passengers can be seated, etc. The accelerator pedal 16 is configured to be able to be depressed by a foot, and is urged to return to an initial position when the foot is taken off of the pedal. As shown in FIG. 3, the shift lever 17 is configured to be switchable to a first forward traveling position L, a second forward traveling position H, a neutral position N, and a reverse traveling position R through a pivoting operation.

[Power Transmission System of Traveling Vehicle Body]

As shown in FIG. 2, a power transmission system of the traveling vehicle body includes the engine E that is constituted by a water-cooled gasoline engine, a belt-type continuously variable speed-changing mechanism 20 (an example of "belt-type power transmission device"), a speed-changing device 21 having a gear mechanism, a rear-wheel differential mechanism 22, a pair of right and left rear axles 23, a power take-off shaft 24, a propeller shaft 25, a front-wheel differential mechanism 26, a pair of right and left front axles 27, and the like. The rear-wheel differential mechanism 22 adjusts the rotational speeds of the right and left rear axles 23 when the traveling vehicle body makes a turn. The front-wheel differential mechanism 26 adjusts the rotational speeds of the right and left front axles 27 when the traveling vehicle body makes a turn.

[Belt-Type Continuously Variable Speed-Changing Mechanism]

As shown in FIG. 2, the driving force of the engine E is first input to the belt-type continuously variable speed-changing mechanism 20. The belt-type continuously variable speed-changing mechanism 20 has an input rotor 30 that is constituted by a pulley, an output rotor 31 that is constituted by a pulley, and an endless belt 32 that is made of rubber, for example, and that extends around and between the input rotor 30 and the output rotor 31. The belt-type continuously variable speed-changing mechanism 20 is configured to transmit the driving force of the engine E toward the traveling devices T via the endless belt 32.

As shown in FIG. 2, the belt-type continuously variable speed-changing mechanism 20 includes a centrifugal clutch 33. When the rotational speed (rotational speed of the engine E) of an output shaft 34 of the engine E is lower than a set value, the centrifugal clutch 33 is disengaged, and the driving force is not output from the belt-type continuously variable speed-changing mechanism 20. On the other hand, when the rotational speed (rotational speed of the engine E) of the output shaft 34 of the engine E reaches or exceeds the set value, the centrifugal clutch 33 is engaged, and the driving force is output from the belt-type continuously variable speed-changing mechanism 20.

[Speed-Changing Device]

As shown in FIG. 2, the output of the belt-type continuously variable speed-changing mechanism 20 is transmitted to the speed-changing device 21. The speed-changing device 21 is configured to change the driving force of the engine E outputted from the belt-type continuously variable speed-changing mechanism 20 and transmit the driving force of the engine E toward the traveling devices T. The belt-type continuously variable speed-changing mechanism 20 is configured to change the output rotational speed in a continuously variable manner depending on the input rotational speed from the engine E.

The speed-changing device 21 shown in FIG. 2 is configured to be switchable to a plurality of speed shift states with different gear ratios. Specifically, the speed-changing device 21 is switchable to the following speed shift states: a first forward traveling state, a second forward traveling state, a neutral state and a reverse traveling state. Different gear ratios are set for the first forward traveling state, the second forward traveling state, the neutral state and the reverse traveling state.

When the shift lever 17 shown in FIG. 3 and the like is pivoted into the first forward traveling position L, the speed-changing device 21 is switched to the first forward traveling state. When the shift lever 17 is pivoted into the second forward traveling position H, the speed-changing device 21 is switched to the second forward traveling state. When the shift lever 17 is pivoted into the neutral position N, the speed-changing device 21 is switched to the neutral state. When the shift lever is pivoted into the reverse traveling position R, the speed-changing device 21 is switched to the reverse traveling state. When the speed-changing device 21 is in the first forward traveling state, the traveling vehicle body travels forward at a low speed; and when the speed-changing device 21 is in the second forward traveling state, the traveling vehicle body travels forward at a higher speed than that in the first forward traveling state. When the speed-changing device 21 is in the neutral state, the traveling vehicle body travels by inertia or stops. When the speed-changing device 21 is in the reverse traveling state, the traveling vehicle body travels backward.

As shown in FIG. 2, the driving force outputted from the speed-changing device 21 is transmitted to the right and left rear axles 23 via the rear-wheel differential mechanism 22, and thus, the right and left rear wheels 12 are rotated. Moreover, the driving force outputted from the speed-changing device 21 is transmitted to the right and left front axles 27 via the power take-off shaft 24, the propeller shaft 25 and the front-wheel differential mechanism 26, and thus, the right and left front wheels 11 are rotated. The power take-off shaft 24 and the propeller shaft 25 are interlocked with each other by a universal joint, and the propeller shaft 25 and the front-wheel differential mechanism 26 are interlocked with each other by a universal joint. A clutch device 28 is provided on the power take-off shaft 24. When the clutch device 28 is engaged, a portion of the power take-off shaft 24 that is located on an upstream side of power transmission and a portion of the power take-off shaft 24 that is located on a downstream side of power transmission are interlocked with each other, and thus, the power is transmitted to the front wheels 11 side (four-wheel drive state). On the other hand, when the clutch device 28 is disengaged, the interlocking between the portions of the power take-off shaft 24 that are respectively located on the upstream side and the downstream side of power transmission is released, and thus, the power is not transmitted from the power take-off shaft 24 to the front wheels 11 side (two-wheel drive state).

[Intake and Exhaust System of Engine]

As shown in FIGS. 1 to 3, the engine E includes a first cylinder A1 and a second cylinder A2, which serve as the plurality of cylinders A. Atomized fuel is injected into the first cylinder A1 from a first injector 40. Atomized fuel is injected into the second cylinder A2 from a second injector 41. The first cylinder A1 and the second cylinder A2 are configured to operate alternately.

As shown in FIG. 1, an intake and exhaust system for the engine E includes: an intake pipe 42 that draws in ambient air from outside; an air cleaner 43 that removes dust from the ambient air; an intake manifold 44 that branches and supplies the dust-removed air to each of the cylinders A; a first exhaust pipe 45 that directs exhaust gas from the first cylinder A1 toward the outside; a second exhaust pipe 46 that directs exhaust gas from the second cylinder A2 toward the outside; an exhaust merging portion 47 where the exhaust gases are merged together; a muffler 48 that muffles exhaust sound, etc.

Suctioned outside air from an intake port 49, that is located in a front region of the traveling vehicle body, is sent to the air cleaner 43 through the intake pipe 42, and the air from which dust has been removed in the air cleaner 43 is branched and supplied to the first cylinder A1 and the second cylinder A2 from the intake manifold 44.

The air supplied from the intake manifold 44 and the fuel injected from the first injector 40 are exploded together in the first cylinder A1 using a first igniter (not shown). As shown in FIG. 1, the exhaust gas from the first cylinder A1 is discharged toward the outside through the first exhaust pipe 45. Moreover, the air supplied from the intake manifold 44 and the fuel injected from the second injector 41 are exploded together in the second cylinder A2 using a second igniter (not shown). The exhaust gas from the second cylinder A2 is discharged toward the outside through the second exhaust pipe 46.

As shown in FIG. 2, the output of the first cylinder A1 and the output of the second cylinder A2 are outputted as the rotation of the output shaft 34 that is integral with a crankshaft (not shown). As shown in FIG. 1, the exhaust gas from the first exhaust pipe 45 and the exhaust gas from the second exhaust pipe 46 are merged together at the exhaust merging portion 47 and discharged through the muffler 48 from an exhaust port 50 that is located in a rear end portion of the traveling vehicle body.

Moreover, as shown in FIG. 3, in the traveling vehicle body, a vehicle speed sensor 51 that detects the traveling speed of the traveling vehicle body is provided in the vicinity of the traveling devices T. Moreover, a rotation sensor 52 that detects the rotational speed of the engine E is provided in the traveling vehicle body.

[Controller]

As shown in FIG. 3, the traveling vehicle body includes a controller 55 that controls the fuel injection quantity with respect to the first cylinder A1 and the second cylinder A2, which serve as the plurality of cylinders A of the engine E, based on the amount of operation of the accelerator pedal 16. The controller 55 is constituted by an ECU (Electronic Control Unit) or the like.

As shown in FIG. 3, the controller 55 includes a map storing unit 56, a maximum traveling speed setting unit 57, a maximum rotational speed setting unit 58, an injection suppressing unit 59 and an injection quantity control unit 60.

In advance, the map storing unit 56 of the controller 55 stores map data D indicating a basic correspondence relationship between an amount of operation associated with an depressed amount by the accelerator pedal 16, and a target rotational speed of the engine E. At the injection quantity control unit 60 of the controller 55, essentially, the fuel injection quantity each with respect to the first cylinder A1 and the second cylinder A2 is adjusted based on this map data D, so that the actual rotational speed of the engine E becomes a rotational speed corresponding to the amount of operation of the accelerator pedal 16.

In the maximum traveling speed setting unit 57 of the controller 55, different set maximum traveling speeds M are set for different speed shift states. Specifically, for the first forward traveling state, a first set maximum traveling speed M1 is set as the set maximum traveling speed; for the second forward traveling state, a second set maximum traveling speed M2 is set as the set maximum traveling speed; and for the reverse traveling state, a third set maximum traveling speed M3 is set as the set maximum traveling speed.

In the maximum traveling speed setting unit 57 of the controller 55, it is determined whether the speed shift state of the speed-changing device 21 is the first forward traveling state, the second forward traveling state, or the reverse traveling state speed-changing device based on information regarding the operating position of the shift lever 17; and based on the determined speed shift state, the set maximum traveling speed M corresponding to the relevant speed shift state is set.

The injection suppressing unit 59 of the controller 55 is configured to output a suppression signal to the injection quantity control unit 60 based on signals that are inputted from the maximum traveling speed setting unit 57 and the maximum rotational speed setting unit 58.

When the traveling speed of the traveling vehicle body reaches or exceeds the set maximum traveling speed M, in response to the suppression signal from the injection suppressing unit 59, the injection quantity control unit 60 of the controller 55 is configured to suppress the fuel injection quantity to be supplied to one/some of the plurality of cylinders A (in the illustrated embodiment, either one of the first cylinder A1 and the second cylinder A2, and not the other at a time), irrespective of the amount of operation of the accelerator pedal 16 (in the illustrated embodiment, the injection quantity control unit 60 is configured to set the fuel injection quantity of the cylinder A1 or A2 to be zero).

When the traveling speed of the traveling vehicle body is equal to or higher than the set maximum traveling speed M, the injection quantity control unit 60 of the controller 55 is configured to sequentially change cylinders A to suppress the fuel injection quantity at predetermined time intervals, in accordance with the suppression signal from the injection suppressing unit 59.

On the other hand, when the actual rotational speed of the engine E reaches or exceeds a set maximum rotational speed R that is set in the maximum rotational speed setting unit 58, the injection quantity control unit 60 of the controller 55 is configured to suppress the fuel injection quantity (set the fuel injection quantity to be zero) with respect to the cylinders A of the engine E, irrespective of the amount of operation of the accelerator pedal 16, in accordance with the suppression signal from the injection suppressing unit 59.

[Suppression of Fuel Injection]

Figure 4:
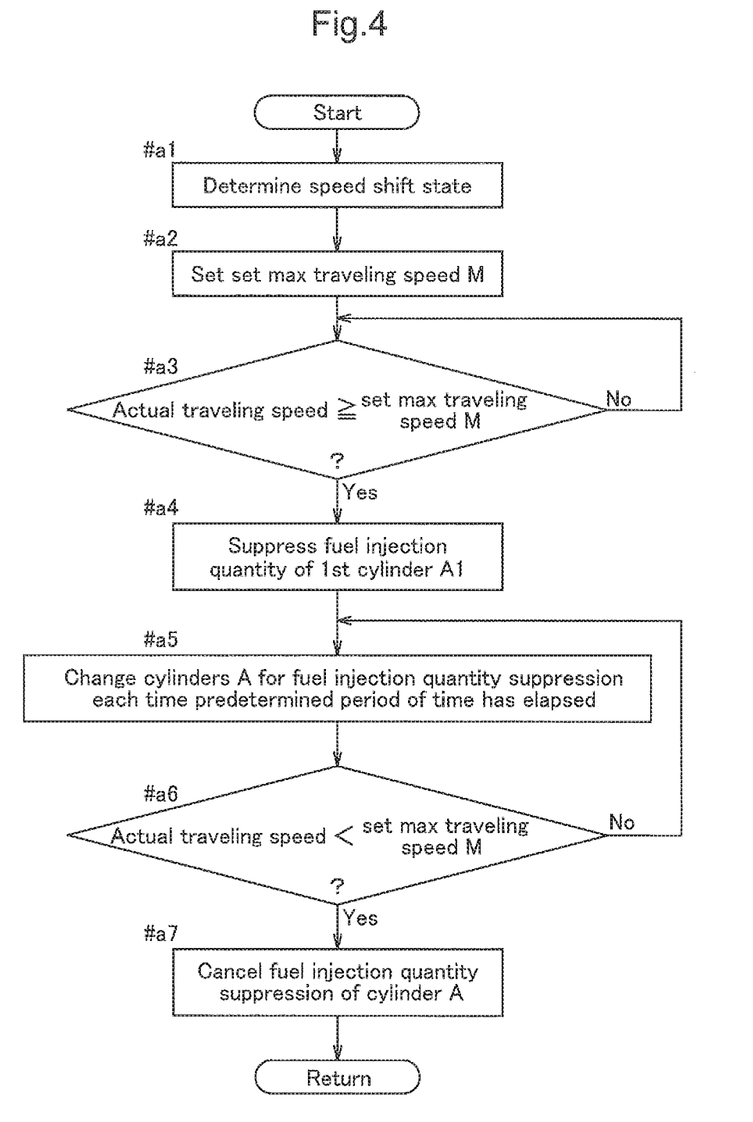
FIG. 4 is a flowchart illustrating a procedure for suppressing a fuel injection quantity with respect to a cylinder of an engine based on a set maximum speed for a traveling vehicle body.

With reference to a flowchart as illustrated in FIG. 4 first, in the controller 55, based on the information regarding the operating position of the shift lever 17, the speed shift state of the speed-changing device 21 is determined from among the first forward traveling state, the second forward traveling state and the reverse traveling state (step # a1). If the speed shift state is the first forward traveling state, the first set maximum traveling speed M1 is set as the set maximum traveling speed M; if the speed shift state is the second forward traveling state, the second set maximum traveling speed M2 is set as the set maximum traveling speed M; and if the speed shift state is the reverse traveling state, the third set maximum traveling speed M3 is set as the set maximum traveling speed M (step # a2).

Then, if the actual traveling speed of the traveling vehicle body, which is detected by the vehicle speed sensor 51 as shown in FIG. 3, reaches or exceeds the set maximum traveling speed M for the determined shift state (step # a3: Yes), the first injector 40 is controlled so that the fuel injection quantity with respect to the first cylinder A1, of the plurality of cylinders A, is suppressed (that is, the fuel injection quantity with respect to the first cylinder A1 becomes zero) irrespective of the amount of operation of the accelerator pedal 16, and thus, the fuel injection quantity with respect to the first cylinder A1 is suppressed (that is, the fuel injection quantity becomes zero) (step # a4). Here, the second injector 41 is controlled so that the fuel injection quantity with respect to the second cylinder A2, of the plurality of cylinders A, becomes a quantity that corresponds to the amount of operation of the accelerator pedal 16. On the other hand, if the actual traveling speed of the traveling vehicle body, which is detected by the vehicle speed sensor 51, is lower than the set maximum traveling speed M for the determined speed shift state, the fuel injection quantity of the fuel to be injected into the first cylinder A1 and the second cylinder A2 by the first injector 40 and the second injector 41, respectively, is controlled based on the amount of operation of the accelerator pedal 16 (step # a3: No).

Then, as illustrated in FIG. 4, if the actual traveling speed of the traveling vehicle body remains equal to or higher than the set maximum traveling speed M for a predetermined period of time, then, cylinder subject to the fuel injection quantity suppression will be changed from the first cylinder A1 to the second cylinder A2 of the plurality of cylinders A (step # a5). That is, the second injector 41 is controlled so that the fuel injection quantity with respect to the second cylinder A2, of the plurality of cylinders A, is suppressed (the fuel injection quantity becomes zero). Meanwhile, the first injector 40 is controlled so that the fuel injection quantity with respect to the first cylinder A1, of the plurality of cylinders A, becomes a quantity that corresponds to the amount of operation of the accelerator pedal 16. If the actual traveling speed of the traveling vehicle body remains equal to or higher than the set maximum traveling speed M for another predetermined period of time, the cylinder, of the plurality of cylinders A, with respect to which the fuel injection quantity is to be suppressed will be changed from the second cylinder A2 to the first cylinder A1. That is, while the actual traveling speed of the traveling vehicle body is equal to or higher than the set maximum traveling speed M (step # a6: No), the cylinder A subject to the fuel injection quantity suppression will sequentially take turn at predetermined time intervals (step # a5). Then, if the actual traveling speed of the traveling vehicle body, which is detected by the vehicle speed sensor 51, becomes lower than the set maximum traveling speed M for the determined speed shift state (step # a6: Yes), the suppression of the fuel injection quantity with respect to the first cylinder A1 and the second cylinder A2 is canceled (step # a7), and the procedure returns.

Thus, compared with e.g. a configuration in which the fuel injection quantity is suppressed (the fuel injection quantity is set to be zero) with respect to all of the plurality of cylinders A if the actual traveling speed of the traveling vehicle body approaches the set maximum traveling speed M, the emission of an abnormal sound, associated with the suppression of the fuel injection quantity, from the first cylinder A1 and the second cylinder A2 is reduced, and the frequency of the emission of an abnormal sound from the engine E as a whole is also reduced. Therefore, the harshness to the ear of noise that is emitted in the case in which the actual traveling speed of the traveling vehicle body approaches the set maximum traveling speed M is reduced, and the unpleasantness felt by the driver and the like is mitigated.

Furthermore, among the plurality of cylinders A, the cylinder A with respect to which the fuel injection quantity is to be suppressed (the fuel injection quantity is to be set to be zero) is sequentially changed, and thus, variations in the temperature and variations in the load between the first cylinder A1 and the second cylinder A2, which serve as the plurality of cylinders A, can be suppressed, so that the maximum traveling speed of the traveling vehicle body can be restricted without impairing the durability of the engine E. Furthermore, the occurrence of variations in the temperature between the first exhaust pipe 45, which directs the exhaust gas from the first cylinder A1, and the second exhaust pipe 46, which directs the exhaust gas from the second cylinder A2, can be avoided (see FIG. 1).

Figure 5:
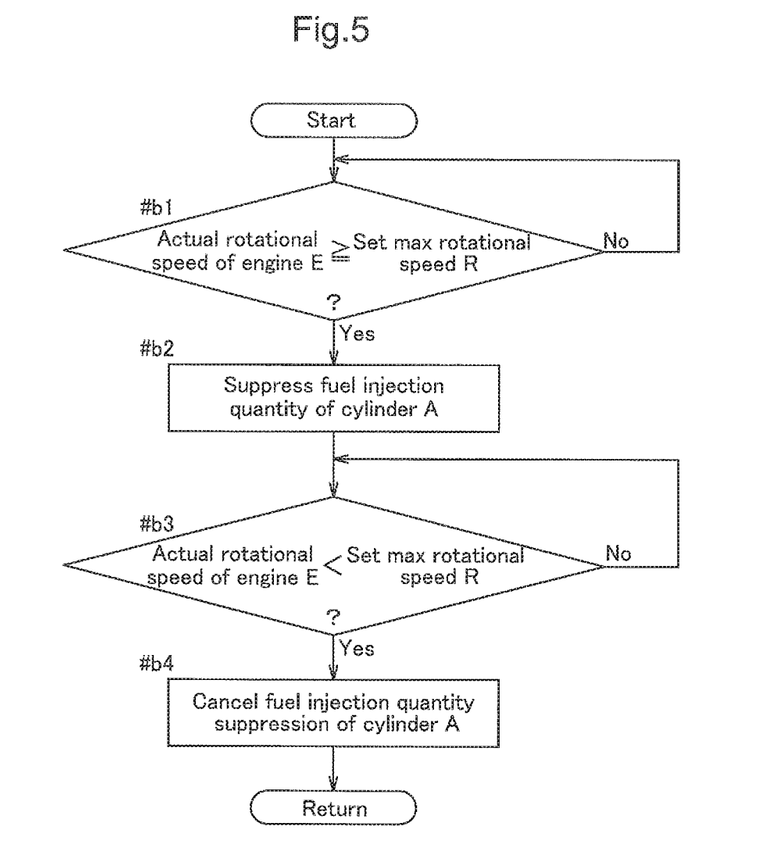
FIG. 5 is a flowchart illustrating a procedure for suppressing the fuel injection quantity with respect to a cylinder of the engine based on a set maximum rotational speed for the engine.

On the other hand, with reference to another flowchart as illustrated in FIG. 5, if the actual rotational speed of the engine E, which is detected by the rotation sensor 52 shown in FIG. 3, reaches or exceeds the set maximum rotational speed R (step # b1: Yes), the fuel injection quantity with respect to one of the first cylinder A1 and the second cylinder A2, which are included in the plurality of cylinders A, is suppressed (the fuel injection quantity becomes zero), irrespective of the amount of operation of the accelerator pedal 16 (step # b2). On the other hand, if the actual rotational speed of the engine E, which is detected by the rotation sensor 52, is lower than the set maximum rotational speed R, the above-described suppression of the fuel injection quantity with respect to the first cylinder A1 and the second cylinder A2 is not performed (step # b1: No). If the actual rotational speed of the engine E, which is detected by the rotation sensor 52, is equal to or higher than the set maximum rotational speed R, the suppression of the fuel injection quantity with respect to the cylinder A is continued (step # b3: No). In this case, it is preferable if the cylinder A with respect to which the fuel injection quantity is to be suppressed is changed at predetermined time intervals. Then, if the actual rotational speed of the engine E, which is detected by the rotation sensor 52, becomes lower than the set maximum rotational speed R (step # b3: Yes), the suppression of the fuel injection quantity with respect to the cylinders A is canceled (step # b4), and the procedure returns to the start.

It should be noted that the set maximum rotational speed R is set to be lower than a limit rotational speed, which is a mechanical limit, of the engine E, for example, and thus, overloading of the engine E can be prevented.

Other Embodiments

Hereinafter, other embodiments in which modifications are made to the foregoing embodiment will be described. The foregoing embodiment and the following other embodiments can be selectively combined unless inconsistency arises. It should be noted that the scope of the present invention is not limited to the contents of the embodiments.

(1) In the foregoing embodiment, the fuel injection quantity with respect to each cylinder A is set to be zero, but such is not limitative and has been described only as an exemplary configuration of the suppression of the fuel injection quantity with respect to the cylinders A. Instead thereof, the fuel injection quantity with respect to the cylinders A may be suppressed such that the fuel injection quantity with respect to the subject cylinder A is reduced to be smaller than usual, for example.

(2) In the foregoing embodiment, when the traveling speed of the traveling vehicle body becomes equal to or higher than the set maximum traveling speed, the cylinder A subject to the fuel injection quantity suppression is sequentially changed at predetermined time intervals, but such is not limitative. Instead thereof, temperature sensors 53 that detect the temperatures of the first exhaust pipe 45, which corresponds to the first cylinder A1, and the second exhaust pipe 46, which corresponds to the second cylinder A2, may be provided, for example; and if the temperature of one of the first exhaust pipe 45 and the second exhaust pipe 46 that is currently subject to the fuel injection quantity suppression becomes lower than a predetermined temperature, the cylinder A subject to the fuel injection quantity suppression may be changed to the other cylinder A.

(3) In the foregoing embodiment, the engine E includes two cylinders A (i.e. the first cylinder A1 and the second cylinder A2) as the plurality of cylinders A, but such is not limitative. Instead thereof, it is also possible to employ an engine including other cylinders A in addition to the first cylinder A1 and the second cylinder A2. That is, the engine may include three or more cylinders as the plurality of cylinders A.

(4) In the foregoing embodiment, only one cylinder A of the plurality of cylinders A is subject to the fuel injection quantity suppression, but such is not limitative. When the engine includes three or more cylinders as the plurality of cylinders A, two or more (i.e. more than one) cylinders A may be subject to the fuel injection quantity suppression.

(5) In the foregoing embodiment, the accelerator pedal 16 has been described as an example of the "accelerator operating tool". However, this is not limitative. Instead thereof, another "accelerator operating tool" such as an accelerator lever may also be employed which is manually operable and the position of which can be retained at a predetermined position.

(6) In the foregoing embodiment, the speed-changing device 21 is switchable to the first forward traveling state, the second forward traveling state and the reverse traveling state, but such is not limitative. Instead thereof, it is also possible to employ a speed-changing device 21 that can also be switched to a different speed shift state other than the first forward traveling state, the second forward traveling state and the reverse traveling state—for example, a speed-changing device 21 that is switchable to four or more forward states with different gear ratios and that can also be switched to a third forward traveling state, etc.

(7) In the foregoing embodiment, as an example of the "belt-type power transmission device", the belt-type continuously variable (stepless) speed-changing mechanism 20 has been described that changes the output rotational speed in a continuously variable manner depending on the input rotational speed, but this is not limitative. Another "belt-type power transmission device" that establishes a constant relationship between the input rotational speed and the output rotational speed after the speed change may also be employed.

(8) In the foregoing embodiment, when the actual rotational speed of the engine E reaches or exceeds a set maximum rotational speed R that is set in the maximum rotational speed setting unit 58, the injection quantity control unit 60 of the controller 55 is configured to suppress the fuel injection quantity with respect to the cylinders A of the engine E, irrespective of the amount of operation of the accelerator pedal 16, in accordance with the suppression signal from the injection suppressing unit 59. In this configuration, only one of the first cylinder A1 and the second cylinder A2 may be subject to the fuel injection quantity suppression, or both cylinders A1, A2 may be instead.

When the engine includes three or more cylinders as the plurality of cylinders A (see other embodiment (3)), only one or some of the cylinders A may be subject to the fuel injection quantity suppression, or all of the plurality of cylinders A.

When such suppression of the fuel injection quantity is done to only one/some of the cylinders A, the subject cylinder(s) A may be preferably the same as one(s) controlled when the traveling speed of the traveling vehicle body is equal to or higher than the set maximum traveling speed M, from a viewpoint of e.g. mitigation of unpleasant noise emitted from the engine E and simpler control configuration therefor. However, this is not limitative and different or all cylinder(s) A may be subject to the fuel injection quantity suppression.

Furthermore, in this control configuration, the subject cylinder(s) A may be changed from one to another sequentially at predetermined time intervals. From the same viewpoint (i.e. mitigation of unpleasant noise emitted from the engine E and simpler control configuration therefor), the "predetermined time intervals" may be preferably the same as those used when the traveling speed of the traveling vehicle body is equal to or higher than the set maximum traveling speed M, but this is not limitative. However, this is not limitative and different time intervals may be set to this end.

What is claimed is:

1. A multipurpose vehicle comprising:
    a traveling vehicle body;
    a vehicle speed sensor that detects a traveling speed of the traveling vehicle body;
    an engine mounted on the vehicle body, the engine having a plurality of cylinders, the plurality of cylinders including a first cylinder and a second cylinder;
    a man-operable accelerator operating tool; and
    a controller that is configured to control a fuel injection quantity with respect to the first cylinder and the second cylinder based on an amount of operation of the accelerator operating tool,
    wherein when the traveling speed of the traveling vehicle body reaches or exceeds a set maximum traveling speed, the controller is configured to suppress the fuel injection quantity supplied to the first cylinder, irrespective of the amount of operation of the accelerator operating tool, and
    when the traveling speed of the traveling vehicle body remains equal to or higher than the set maximum traveling speed, the controller is configured to change a cylinder subject to fuel injection quantity suppression from the first cylinder to the second cylinder, wherein the fuel injection quantity suppression of the second cylinder comprises reducing the fuel injection quantity, to be supplied to the second cylinder, to a quantity greater than zero.

2. The multipurpose vehicle according to claim 1, further comprising:
    a rotation sensor that detects an actual rotational speed of the engine,
    wherein if the rotational speed of the engine reaches or exceeds a set maximum rotational speed, the controller is configured to suppress the fuel injection quantity supplied with respect only to at least one of the plurality of cylinders, irrespective of the amount of operation of the accelerator operating tool.

3. The multipurpose vehicle according to claim 1, further comprising:
    a belt-type power transmission device that is configured to receive a driving force of the engine, and
    wherein the belt-type power transmission device has an input rotor, an output rotor, and an endless belt extending around and between the input rotor and the output rotor.

4. The multipurpose vehicle according to claim 1, further comprising:
    a speed-changing device that is configured to receive a driving force of the engine and change the driving force to be switched to a plurality of speed shift states with different gear ratios,
    wherein the set maximum traveling speed is set in the controller such that different set maximum traveling speeds are set for different ones of the speed shift states switched by the speed-changing device.

5. The multipurpose vehicle according to claim 1, further comprising:
    a first exhaust pipe provided in association with the first cylinder to discharge an exhaust gas therefrom;
    a second exhaust pipe provided in association with the second cylinder to discharge the exhaust gas therefrom; and
    a temperature sensor that detects a temperature of the first exhaust pipe,
    wherein, when the temperature detected by the temperature sensor of the first exhaust pipe is lower than a predetermined temperature, the controller is configured to change the cylinder subject to fuel injection quantity suppression from the first cylinder to the second cylinder.

6. A multipurpose vehicle comprising:
    a traveling vehicle body;
    a vehicle speed sensor that detects a traveling speed of the traveling vehicle body;

an engine mounted on the vehicle body, the engine including a first cylinder and a second cylinder;

a speed-changing device that receives a driving force of the engine and changes the driving force to be switched to a plurality of speed shift states with different gear ratios;

a man-operable accelerator operating tool; and a controller that is configured to control a fuel injection quantity with respect to the first cylinder and the second cylinder based on an amount of operation of the accelerator operating tool, the controller including a maximum traveling speed setting unit that sets a maximum traveling speed of the traveling vehicle body, wherein different maximum traveling speeds are set for different ones of the speed shift states switched by the speed-changing device, wherein when the traveling speed of the traveling vehicle body detected by the vehicle speed sensor reaches or exceeds the maximum traveling speed that is set in the maximum traveling speed setting unit, the controller is configured to suppress the fuel injection quantity supplied to the first cylinder, irrespective of the amount of operation of the accelerator operating tool, for a first predetermined time interval, and when the traveling speed of the traveling vehicle body remains equal to or higher than the set maximum traveling speed after lapse of the first predetermined time interval, the controller is configured to change a cylinder subject to fuel injection quantity suppression from the first cylinder to the second cylinder, wherein the fuel injection quantity suppression of the second cylinder comprises reducing the fuel injection quantity, to be supplied to the second cylinder, to a quantity greater than zero;

wherein the controller is configured to change the cylinders subject to the fuel injection quantity suppression from one to another sequentially after lapse of a second predetermined time interval; and wherein the first predetermined time interval is different from the second predetermined time interval.

* * * * *

UNITED STATES PATENT AND TRADEMARK OFFICE
CERTIFICATE OF CORRECTION

PATENT NO. : 10,767,615 B2
APPLICATION NO. : 15/354119
DATED : September 8, 2020
INVENTOR(S) : Noriyasu Honjo Page 1 of 1

It is certified that error appears in the above-identified patent and that said Letters Patent is hereby corrected as shown below:

On the Title Page

Column 1, Prior Publication Data, Line 2-3, Below "2017" insert:
-- (30) Foreign Application Priority Data
Mar. 3, 2016 (JP) .......................... 2016-041388 --

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*